United States Patent Office 3,116,086
Patented Dec. 31, 1963

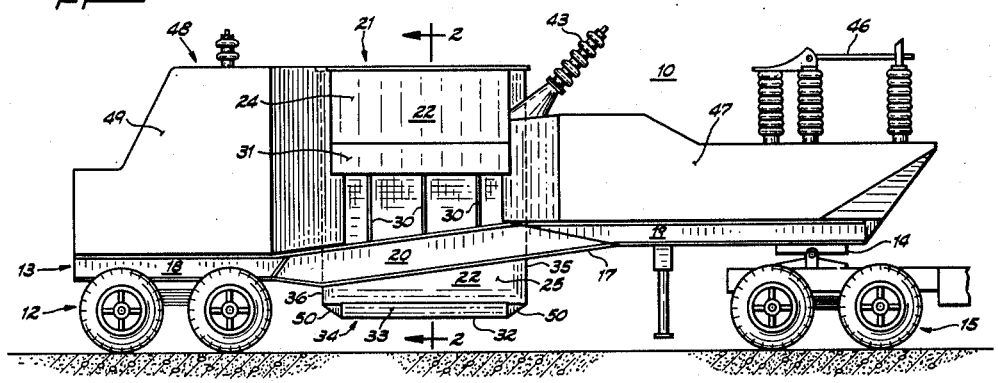

3,116,086
MOBILE ELECTRICAL TRANSFORMER SUBSTATION
Bernard A. Barengoltz, 1615 Worcester Drive, Pittsburgh 16, Pa.
Continuation of abandoned application Ser. No. 778,800, Dec. 8, 1958. This application Nov. 13, 1961, Ser. No. 153,251
7 Claims. (Cl. 296—28)

This invention relates to mobile electrical power supply apparatus and more particularly to such apparatus commonly referred to as a mobile substation.

This application is a continuation of my copending application Serial No. 778,800, filed December 8, 1958, now abandoned.

Mobile substations permit continuity of customer electrical service while permanent installations are being inspected or undergoing periodic maintenance as well as during emergencies when the permanent installation has been temporarily disabled. Further, mobile substations are frequently used to supply supplementary capacity to permanent installations during temporary peak load conditions.

A mobile substation must conform to state highway weight limitations and must be designed within existing road clearances. The physical dimensions of the transformer within such weight and road clearance restrictions limit the kva. capacity of the mobile substation. In prior art mobile substations the trailer and the transformer carried thereby were designed and constructed independently. The transformer conventionally rested on the trailer midway between the front and rear carriages in the manner of a fixed-ended beam loaded at the center, thereby requiring the trailer to be of relatively high flexural strength. Further, for a given overhead road clearance this prior art construction with transformer resting on the trailer unnecessarily limited the height of the transformer.

It is an object of the invention to provide an improved mobile substation which, within given highway weight and road clearance limitations, can incorporate a larger kva. size transformer than was possible with prior art construction. It is a further object of the invention to provide such an improved mobile substation wherein the vertical dimension of the transformer can be greater than in prior art construction.

It is another object of the invention to provide a mobile substation wherein the transformer casing forms a part of and adds flexural strength to the frame of the substation trailer, thereby permitting use of frame members of reduced section modulus.

Still another object of the invention is to provide a mobile substation wherein the trailer frame reinforces and strengthens the transformer casing, whereby reinforcing members conventionally required to brace the casing can be omitted.

A still further object of the invention is to provide a mobile substation having a lower center of gravity than prior art apparatus.

In accordance with the invention the trailer of a mobile substation includes two generally horizontal, spaced apart, parallel beams defining a well and supporting the transformer casing positioned in the well with the vertical casing sidewalls extending below the beams. Consequently the center of gravity of the mobile substation is lowered in comparison to prior art apparatus wherein the transformer rested on the trailer bed, and thus a transformer of greater height can be utilized for a given road clearance. The beams are rigid with and reinforce the casing sidewalls, thereby eliminating reinforcing members which were required to brace the lower portion of the casing sidewalls in prior art constructions. The casing, being rigid with the beams, provides a portion of the required beam flexural strength and thus permits use of beams of reduced section modulus.

These and other objects and advantages of the invention will be better understood from a reading of the following description when taken in conjunction with the accompanying drawing in which:

FIG. 1 is a side view illustrating a mobile electrical substation embodying the invention;

FIG. 2 is a vertical cross-sectional view taken along line 2—2 of FIG. 1 and illustrating the relative positions of the trailer frame members, transformer casing sidewalls, and reinforcing members; and FIG. 3 is a partial horizontal cross-sectional view taken along line 3—3 of FIG. 2 omitting the transformer core and coil assembly within the casing.

Referring to the drawing, FIG. 1 illustrates a mobile substation having a trailer designated generally as 10. The trailer 10 includes a rear carriage 12 upon which is supported one end of a frame designated generally as 13. The frame 13 extends horizontally from the rear carriage 12 and its forward end is adapted to engage a fifth wheel 14 supported by a carriage 15 of a tractor which transports the mobile substation.

The frame 13 includes a pair of generally horizontal spaced apart beams 17, preferably structural iron I-beams, extending the length of the trailer 10 on either side thereof and defining a well 16 (see FIG. 3). Although each beam 17 may obviously be fabricated as a single member, each of the beams 17 is illustrated as being constructed from three sections 18, 19, and 20 of structural iron which are joined, preferably by welding, to form a single elongated beam. This manner of fabrication results in economy of construction. The sections 18, 19, and 20 are assembled so that the section 18 supported by the rear carriage 12 is substantially horizontal, the section 19 supported by the tractor carriage 15 is also substantially horizontal but in a plane vertically above that of section 18, and the middle section 20 is disposed at an angle to the horizontal intermediate and welded to the two horizontal sections 18 and 19.

A metallic transformer casing 21 of generally rectangular cross section is disposed within the well 16 and extends below the beams 17. A pair of opposed, vertically extending sidewalls 22 of the casing are contiguous and rigidly connected to the beams 17, preferably by welding, along the entire length of the sidewalls 22. Each sidewall 22 includes an upper vertical portion 24, a lower vertical portion 25 contiguous a beam 17, and an outwardly flaring portion 26 between the upper and lower vertical portions 24 and 25. A plurality of spaced apart ribs 30 welded to and extendnig laterally from each of the casing sidewalls 22 rest upon and are secured to each beam 17. A reinforcing member 31 of L-shaped cross section secured to and resting on the ribs 30 is welded to the lower vertical portion 25 and to the upper vertical portion 24 of the casing sidewall 22. The reinforcing members 31 and the ribs 30 mechanically brace the casing sidewalls 22 to withstand the forces resulting from vacuum within casing 21. The weight of the transformer is at least partially transmitted through the outwardly flaring portions 26, the reinforcing members 31, and the ribs 30 to the beams 17.

The lower end portion 33 of each sidewall 22 flares inwardly and terminates in a bottom wall 34 of the casing 21. The bottom wall 34 includes a flat, horizontal, plate-like portion 32 at the lowest extremity of the casing 21 and two horizontal portions 37 and 38 spaced vertically upward therefrom at the front and rear ends of the plate-like portion 32 and joined thereto by vertically extending portions 39. The horizontal portions 37 and 38 together with the vertical portions 39 define upwardly projecting steps within the casing 21. A transformer core and coil assembly 40 immersed in a liquid dielectric 41 within the casing 21 includes a laminated magnetic core 42 linked by electrical windings 44. The ends of channel iron, lower core clamping members 45 secured to and disposed on opposite sides of the lower yoke of the magnetic core 42 are supported on the steps defined by the horizontal portions 37 and 38 and vertical portions 39. Triangular ribs 50 secured to the bottom surface of the horizontal portions 37 and 38 and to the vertical portions 39 mechanically brace the steps which support the weight of the core and coil assembly 40.

A pair of spaced apart cross members 23 secured to the front and rear walls 35 and 36 of casing 21 are welded to the beams 17.

Electrical connections to the transformer primary windings 44 within casing 21 are made through insulating bushings 43 protruding at an angle through the front wall 35 of casing 21. Air disconnect switches 46 for interrupting electrical connections to the primary windings 44 provided at the front end of the trailer 10 are enclosed within vertical panels 47 of an open housing. The rear portion of the vertical panels 47 flare inwardly and are secured to the side walls 22 of the transformer casing 21. A compartment 48 disposed at the rear of the trailer 10 includes vertical panels 49 flaring inwardly at the forward ends thereof and secured to the sidewalls 22 of the transformer casing 21. The compartment 48 conventionally encloses a low voltage oil circuit breaker connected in the secondary side of the transformer, metering current transformers, and other control equipment (not shown).

In prior art constructions it was necessary to provide reinforcing members for both the upper and lower portions of the transformer casing sidewalls to brace the sidewalls sufficiently to withstand the forces resulting from vacuum within the casing during the operation of the transformer. The beams 17, being contiguous and rigid with the casing sidewalls 22, provide the necessary reinforcement for the lower portion of the transformer casing 21. Therefore, the need for separate reinforcing members for the lower portion of the transformer casing sidewalls 22 is obviated and a reduction in weight of the mobile substation is achieved.

Inasmuch as sidewalls 22 are secured to the beams 17 along the entire length of said sidewall, the casing 21 adds to the flexural strength of the beams. As a result of this integrated construction, the flexural strength of the beams 17 need not be as great as that required in prior art constructions wherein the beams had to be of sufficeintly large section modulus to support the weight of the transformer in the manner of a fixed-ended beam loaded at the center. The flexural strength of a beam is directly proportional to the section modulus, which in turn is directly proportional to the dimensions of the beam. Therefore, since a beam of reduced section modulus may be used, there is a resultant reduction in size and weight of the frame 13.

The well 16 in the trailer 10 allows the transformer casing 21 to extend below the frame 13. Consequently, the center of gravity of the mobile substation is lowered in comparison with prior art apparatus since the transformer core and coil assembly 40 and the oil 41, which make up the principal source of weight in the mobile substation, are carried in a lower position than in prior art apparatus wherein the transformer casing rested on the trailer bed.

Further, the electrical transformer casing 21 disposed within the well 16 results in a mobile electrical substation incorporating an electrical transformer with a greater vertical dimension for a given road clearance than prior art apparatus. This incorporation of a larger transformer is possible because the casing 21 extends through the frame 13 and, consequently, the clearance from the road to the underside of the mobile substation is measured to the bottom of the casing 21 and not to the bottom of the frame 13.

Although a preferred embodiment of the invention has been illustrated and described wherein the beams 17 extend longitudinally of the trailer 10, it will be apparent that the invention also comprehends beams extending laterally of the trailer and defining a well for receiving the transformer casing 21.

While the invention has been described with reference to the particular embodiment shown, it is not intended that the invention be limited thereto unless such limitation is warranted by the appended claims.

What I claim is:

1. A mobile substation having a trailer and an encased electrical transformer, said trailer including a carriage, a frame supported at one end by said carriage, said frame including a pair of spaced apart, generally horizontal, straight elongated beams defining opposed sides of a well in said trailer, the casing of said transformer having a pair of opposed sidewalls and being disposed in said well, said beams being adjacent said sidewalls and extending longitudinally thereof and having vertically spaced apart upper and lower portions welded to said sidewalls along substantially the entire horizontal length of said sidewalls and said beams being structurally integrated with and reinforcing said sidewalls and carrying the entire weight of said transformer casing and said sidewalls increasing the flexural strength of said beams, whereby said beams may be of reduced section modulus and reinforcing means are not required along the lower portion of said sidewalls, said casing sidewalls extending below said beams and the bottom wall of said casing being closer than said beams to the surface on which said substation rests, whereby road clearance is measured to the bottom wall of said casing and the height of said transformer casing may be increased for a given road clearance.

2. In combination, a mobile substation including two generally horizontal, straight I-beams extending longitudinally on opposite sides of said substation and defining opposed sides of a well in said substation, an electrical transformer having a casing, the casing of said transformer having pairs of opposed vertical sidewalls and being disposed in said well with one pair of said sidewalls adjacent to said beams, primary insulating bushings extending generally longitudinally of said substation from one of the other pair of casing sidewalls, said I-beams extending longitudinally of said one pair of casing sidewalls and the upper and lower flanges of said I-beams being welded to said one pair of casing sidewalls along substantially the entire length of said sidewalls and said beams being structurally integrated with and reinforcing said one pair of casing sidewalls and constituting the sole support for the weight of said transformer casing and said one pair of casing sidewalls increasing the flexural strength of said beams, whereby said beams may be of reduced section modulus and reinforcing members may be eliminated from the lower portion of said one pair of casing sidewalls, said casing sidewalls extending below said beams and the bottom wall of said casing being closer than said beams to the surface on which said substation rests, whereby road clearance is measured to the bottom wall of said casing and the height of said transformer casing may be increased for a given road clearance.

3. A mobile substation having a trailer and an encased electrical transformer, said trailer including a carriage, a frame supported at one end by said carriage, said frame including a pair of spaced apart, generally horizontal, elongated, straight beams defining opposed sides of a well in said trailer, the casing of said transformer having a pair of opposed vertical sidewalls and being disposed in said well with said beams extending longitudinally of said pair of sidewalls, said casing also having a vertical wall generally transverse to said beams, an insulating bushing extending generally longitudinally of said trailer from said vertical casing wall, said casing being supported on said beams and said beams carrying the entire weight of said casing, said sidewalls extending below said beams and the bottom wall of said transformer casing being closer than said beams to the surface on which said substation rests, whereby road clearance is measured to the bottom wall of said casing and the height of said transformer casing may be increased for a given road clearance.

4. A mobile substation having a trailer and an encased electrical transformer, said trailer including a carriage, a frame supported at one end by said carriage, said frame including a pair of spaced apart, generally horizontal, elongated straight beams, said beams defining opposed sides of a well in said trailer, the casing of said transformer having pairs of opposed sidewalls and being disposed in said well with said beams extending longitudinally of one pair of said opposed sidewalls and said casing being supported on said beams, primary insulating bushings extending generally longitudinally of said trailer from one of the other pair of said sidewalls, said beams constituting the sole support for said transformer and said sidewalls extending below said beams and the bottom wall of said casing being closer than said beams to the surface on which said substation rests, whereby road clearance is measured to the bottom wall of said casing and the height of said transformer casing may be increased for a given road clearance.

5. A mobile substation having a trailer and an encased electrical transformer, said trailer including a carriage and two elongated generally horizontal straight beams extending from said carriage on opposite sides of said trailer and defining opposed sides of a well in said trailer, the casing of said transformer having a pair of opposed vertical sidewalls and being disposed in said well, said beams being adjacent said sidewalls, and extending longitudinally thereof and having vertically spaced apart upper and lower members welded to said sidewalls along substantially the entire length of said sidewalls, horizontal reinforcing members extending longitudinally of and welded to said sidewalls above said beams, a plurality of ribs disposed adjacent and welded to each of said sidewalls and having the lower end thereof welded to said upper member of one of said beams and the upper end thereof welded to one of said reinforcing members, said ribs, said sidewalls, and said beams being structurally integrated and said beams reinforcing said sidewalls and said casing sidewalls increasing the flexural strength of said beams, whereby said beams may be of reduced section modulus and reinforcing members are not required for the lower portion of said sidewalls, said beams constituting the sole support for the weight of said transformer casing.

6. A mobile substation having a trailer and an encased electrical transformer, said trailer including a carriage and two elongated, straight, generally horizontal I-beams extending from said carriage on opposite sides of said trailer and defining opposed sides of a well in said trailer, the casing of said transformer having pairs of opposed vertical sidewalls and being disposed in said well with one pair of said opposed sidewalls adjacent to said beams, primary insulating bushings extending generally longitudinally of said trailer from one of the other pair of casing sidewalls, primary electrical switch means on said trailer adjacent to but spaced longitudinally of said trailer from said primary insulating bushings and being supported from said beams, said I-beams extending longitudinally of said one pair of casing sidewalls and each of the cross-pieces of I-beams being welded to said one pair of casing sidewalls along substantially the entire length of said sidewalls and said I-beams being structurally integrated with and reinforcing said one pair of casing sidewalls and constituting the sole support for the weight of said transformer casing and said one pair of casing sidewalls increasing the flexural strength of said beams, whereby said beams may be of reduced section modulus and reinforcing members may be eliminated from the lower portion of said one pair of casing sidewalls, said casing sidewalls extending below said beams and the bottom wall of said casing being nearer than said beams to the surface on which said substation rests, whereby road clearance is measured to the bottom wall of said casing and the height of said transformer casing may be increased for a given road clearance.

7. A mobile substation having a trailer and an encased electrical transformer, said trailer including a carriage and two generally horizontal structural iron beams extending from said carriage on opposite sides of said trailer and defining opposed sides of a well in said trailer, the casing of said transformer having a pair of opposed vertical sidewalls and being disposed in said well with said sidewalls extending below and rigid with said beams, whereby said beams reinforce said sidewalls and said casing increases the flexural strength of said beams, portions of said sidewalls flaring outwardly, reinforcing members rigid with said sidewalls in vertically spaced relation to said beams and supporting said outwardly flaring portions, and a plurality of ribs rigid with and extending laterally of each of said sidewalls and connecting said reinforcing members and said beams, whereby said flared portions of said sidewalls and said reinforcing members are structurally integrated with said beams and cooperate therewith in supporting the weight of said encased transformer and bracing the sidewalls thereof.

References Cited in the file of this patent

FOREIGN PATENTS

| | | |
|---|---|---|
| 454,322 | Germany | Jan. 5, 1928 |
| 471,737 | Germany | Feb. 18, 1929 |
| 562,990 | Italy | May 22, 1957 |
| 146,162 | Switzerland | June 16, 1931 |

UNITED STATES PATENT OFFICE
CERTIFICATE OF CORRECTION

Patent No. 3,116,086                            December 31, 1963

Bernard A. Barengoltz

It is hereby certified that error appears in the above numbered patent requiring correction and that the said Letters Patent should read as corrected below.

In the grant, lines 1 to 3, for "Bernard A. Barengoltz, of Pittsburgh, Pennsylvania," read -- Bernard A. Barengoltz, of Pittsburgh, Pennsylvania, assignor to McGraw-Edison Company, of Milwaukee, Wisconsin, a corporation of Delaware, --; line 12, for "Bernard A. Barengoltz, his heirs" read -- McGraw-Edison Company, its successors --; in the heading to the printed specification, lines 4 and 5, for "Bernard A. Barengoltz, 1615 Worcester Drive, Pittsburgh 16, Pa." read -- Bernard A. Barengoltz, Pittsburgh, Pa., assignor to McGraw-Edison Company, Milwaukee, Wis., a corporation of Delaware --.

Signed and sealed this 2nd day of June 1964.

(SEAL)
Attest:

ERNEST W. SWIDER                          EDWARD J. BRENNER
Attesting Officer                      Commissioner of Patents